Feb. 15, 1938.     I. M. LADDON     2,108,289
AIRCRAFT WINDSHIELD AND HATCH
Filed June 6, 1935
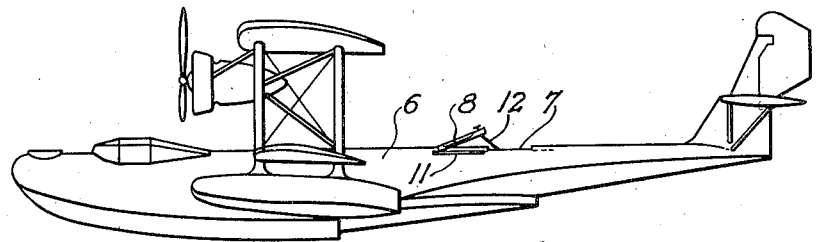
Fig. 1.
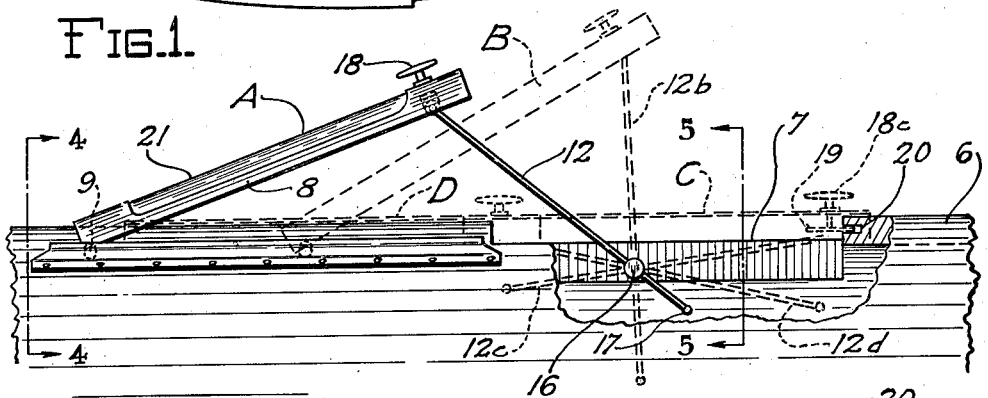
Fig. 2.
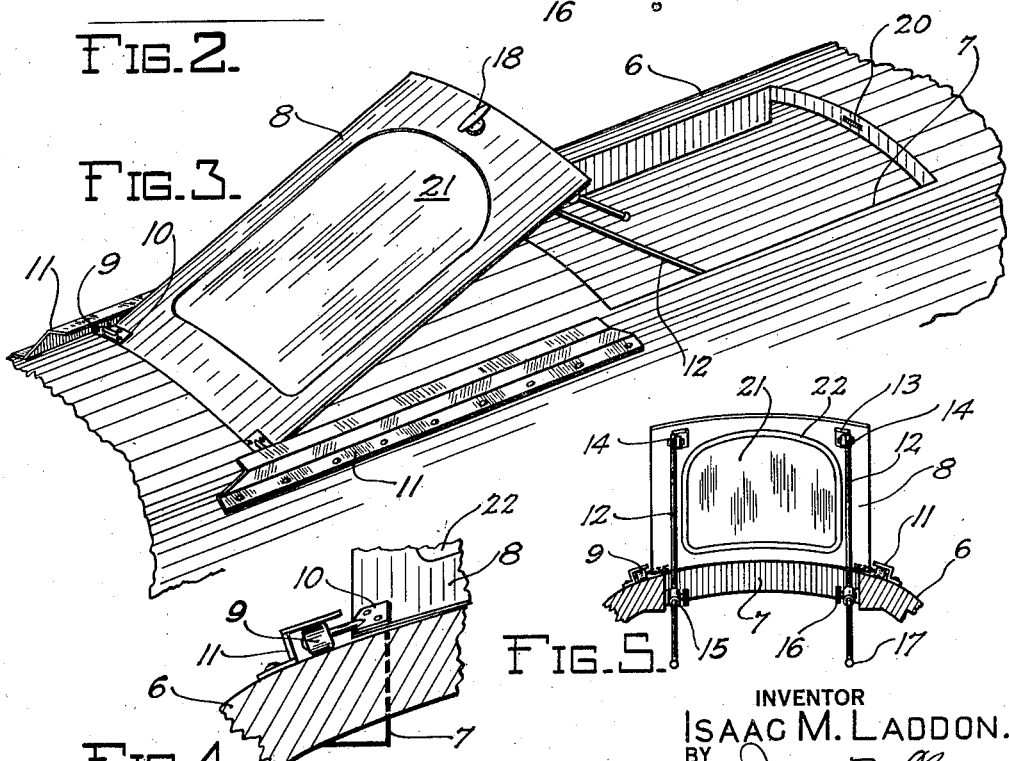
Fig. 3.
Fig. 4.
Fig. 5.
INVENTOR
ISAAC M. LADDON.
BY James M. Clark
ATTORNEY Patented Feb. 15, 1938

2,108,289

UNITED STATES PATENT OFFICE 2,108,289

AIRCRAFT WINDSHIELD AND HATCH

Isaac M. Laddon, Buffalo, N. Y., assignor to Consolidated Aircraft Corporation, a corporation of Delaware Application June 6, 1935, Serial No. 25,234

4 Claims. (Cl. 244—121)

My invention relates to aircraft and more particularly to a combined windshield and cover for a hatch or other opening therein.

It is often a requirement in the design and construction of present day aircraft that hatches or auxiliary cockpits be provided in the body thereof, especially in aircraft of the military type and flying boats. These openings are usually separated from the main cockpit or cabin of the aircraft, and since the same are intended to be used during flight, it is essential that means be provided to protect the occupants thereof from the airstream, which at speeds of modern aircraft attains considerable force.

It also frequently occurs that an aircraft provided with such openings or cockpits, and protective means therefor, are required to fly for long periods of time under conditions in which there is no necessity for use of the auxiliary cockpit or hatch and its associated windshield. Therefore, it becomes desirable under such conditions to reduce the parasite resistance of the aircraft by covering the opening and, whenever possible, by dispensing with the projecting windshield and other devices. Under such conditions, the windshield may be removed and a separate cover provided for the hatch or cockpit opening, but it has been found that such practice is cumbersome and highly inconvenient, and for other reasons, has not proven to be satisfactory.

It is, therefore, an object of the present invention to provide a single cover member utilizable both as a hatch or cockpit cover and as a windshield for the protection of the occupant of the cockpit, or a combination of the two uses at the same time.

It is a further object of the invention to provide such a device which can be readily moved to a forward position and adjustably tilted to any desired angle for use as a windshield. It is also an object to provide such a device which is adapted to lie flat against the fuselage surface and to be substantially streamlined therewith in both the covered and uncovered conditions of the hatch.

It is also an object to provide such a combination windshield and hatch cover which is readily operable from within and without the fuselage, and which is capable of being releasably fastened to any position to which it may be adjusted.

My invention attains the above objects by means of a relatively simple construction comprising a longitudinally sliding member pivotally provided with rollers at its forward end and provided with releasable fastening and tilting means at its rearward end.

Other no less important objects will appear from a reading of the annexed specification and claims, and from an examination of the drawing forming a part hereof, it being understood that the embodiment of the invention shown and described herein is by way of an example only and that other forms coming within the scope of the claims are intended to be included herein.

In the accompanying drawing in which like characters of reference indicate corresponding parts in all the views:

Fig. 1 is a side elevation of an aircraft in which a preferred embodiment of my invention is shown;

Fig. 2 is an enlarged side elevation of the combination windshield and hatch cover shown in Fig. 1, and in which several of the various positions of the windshield and cover are shown in dotted lines;

Fig. 3 is a perspective view of the same;

Fig. 4 is a further enlarged cross-sectional detail of the fuselage portion, showing the roller and guide rail assembly at the forward end of the windshield, taken along the lines 4—4 of Fig. 2; and Fig. 5 is a cross-sectional elevation of the windshield taken along the lines 5—5 of Fig. 2.

Referring now to Fig. 1 wherein I have shown an aircraft of conventional type having a hull or fuselage portion 6 in which is provided an opening 7 through the upper surface thereof for the purpose either of providing access to the interior of the craft, or which is adapted to be occupied during flight by a machine gunner, or observer. Just forward of the hatch 7 is shown a windshield 8 having its lower forward end in close proximity to the top of the body 6 between the longitudinally extending guide rails 11, and having attached to its rearward upper end, adjusting rods 12 which extend into the hatch or cockpit opening 7.

Referring now to Fig. 2, the relative position of the windshield shown in Fig. 1 is indicated by the full line position at A. The combination hatch and windshield member 8 is preferably constructed of sheet metal bent from a substantially rectangular sheet and having a lateral curvature corresponding substantially to that of the top surface of the fuselage, and of a length and width which are somewhat greater than the corresponding dimensions of the hatch opening 7 in order that it will lap or extend thereover when in the closed position. The cover 8 is preferably provided in its central portion with a transparent windshield 21 constructed of glass or other suitable transparent material and fixedly held within the opening in the cover 8 by means of the frame member 22.

The combination hatch cover and windshield 8 is provided at its lower forward corners with wheels or rollers 9 adapted to rotate freely upon the transversely extending pins forming a part of the fittings 10 which are riveted or otherwise rigidly fastened to the corners of the cover 8. Extending longitudinally forward of the hatch opening 7 and spaced apart a distance somewhat greater than the width thereof, are provided two guide rails 11 which may be substantially Z-shaped as shown, and are riveted or otherwise fastened through their lower flanges to the outer surface of the fuselage 6. The upper substantially horizontal flanges of the rails 11 extend toward and face the corresponding flange of the other rail and are both adapted to form tracks between the lower surfaces of these flanges and the upper surface of the body 6 such that the cover 8 and wheels 9 are free to slide therebetween in a fore and aft direction. The spacing of the parallel rails 11 is such that the member 8 is restrained from excessive lateral movement due to the clearance between the edges of the member 8 and the edges of the upper flanges of the rails 11 and a similar clearance space between the upstanding stem or web of the rail 11 and the rounded end of the pivot pin of the roller 9.

Hinge fittings 13 attached to the lower surface of the cover member 8, adjacent to the rear corners of the same, are provided with downwardly extending perforated ears through which pins 14 are transversely positioned to provide a pivot for the obliquely extended supporting arm or rod 12. A swiveling fitting 15 is provided on the interior wall of each side of the hatch 7, and the rods 12 are adapted to be passed through such fittings and clamped at any desired position and angle by means of the clamping wheel or thumb screw 16. The fittings 15, when the thumb screws are in their released positions, permit tilting of the supporting arms 12 through a number of various positions within a substantially vertical plane, being free to rotate about its base portion, which is securely fastened to the fuselage 6, and to rotate about the transversely extending axis of the thumb screw 16, which is normal to the plane described by the supporting arms. The arms 12 are provided at their lower extremities with a knob or ball-shaped protuberance 17 which serves as a surface against which the operator may push the rods forwardly or withdraw them to a rearward position, and which serves further to prevent the rod from accidentally passing through the opening in the swiveling fitting 15. These knobs are preferably threaded to the rod ends to facilitate removal of the entire cover assembly if desired.

The cover 8 is further provided in its central portion near its rearward edge with a T-shaped handle 18 which is rotatably attached to the sheet member 8 extending downwardly therethrough and provided at its lower portion with another T-shaped member comprising tongues 19 which are adapted to be extended into the recess 20 in the hull 6 at the rearward edge of the hatch opening 7 when the cover is fully retracted to its closed position, thereby preventing accidental removal of the cover from this position. Either tongue portion is adapted to be used as a handle operable from within the fuselage to engage or release the other tongue portion.

In operation, it will be noted that as the cover is located near its extreme forward position, indicated at A in Fig. 2, its lower forward end will rest upon the rollers 9 in close proximity to the upper surface of the hull 6 and will be restrained from any vertical movement by the upper flanges of the rails 11. The rearward or top end of the windshield 8 is supported by the obliquely extending arms 12 which are rigidly clamped to the hatch side wall by means of the swiveling fittings and clamps 15 and 16. In the position indicated at A, it will be noted that the member 8 forms a windshield affording the occupant of the cockpit adequate protection from the airstream while permitting him to look in a forward direction through the transparent windshield portion 21.

Should it be desired to increase or decrease the angle of inclination of the cover member 8, or to partially cover the hatch opening, such as for instance the position which would be indicated by the dotted lines at B in Fig. 2, this can be readily accomplished by releasing the thumb screws 16 and moving each rod 12 through its swiveling fitting 15, and the cover 8 in the required directions sufficient distances until the cover member 8 assumes the desired position at which it may be fixedly clamped and held by tightening the thumb screws 16. The rollers serve as a pivot about which the windshield may be rotated to any of these positions and serve further as a movable or translatable pivot point which may be positioned at any point intermediate the ends of the rails 11 and adapt the cover to be rotated about that point. Regardless of the point at which the roller may be positioned for rotation or inclination of the cover member 8, when the rod is securely clamped by means of the fitting and thumb screws 15 and 16, the rollers 9 will be securely held at that point.

When it is desired to cover the hatch opening 7 by withdrawing the cover 8 into the closed position indicated by the dotted lines at C in Fig. 2, the thumb screws 16 are released permitting the rear end of the hatch cover 8 to be dropped to the upper surface of the fuselage 6 and retracted to its rearmost position where one of the tongues 19 may engage the recess in the rear wall of the hatch. When in this position, the free, or knob end 17 of the rod 12 will swing about the swiveling fitting 15 as an axis into a position where it will extend in a forward direction as indicated by 12C. In this closed position indicated by the dotted lines at C, the hatch cover 8 is substantially streamlined with the surface of the hull or fuselage 6 and offers a minimum of resistance or aerodynamic drag during flight of the aircraft.

The cover member 8 may also be pushed forwardly along the rollers 9 until the handle 18 with its attached tongue 19 prevents further forward movement by striking the forward edge of the hatch opening 7. At this position of the cover indicated by the dotted lines D in Fig. 2, the cover member may be adjustably held by tightening the thumb screws 16, the rearward position of the rods 12 assuming the dotted position indicated at 12d. This position of substantially full hatch opening is also one wherein the cover is streamlined with the hull 6, a condition which is sometimes desirable when the cockpit is occupied by a machine gunner or observer, and which is not readily attained by windshield devices heretofore proposed.

The rails may either extend forwardly a sufficient distance to prevent the cover being pushed to a position where the rollers 9 would become disengaged, or stops may be provided to limit the fore and aft movement of the rollers.

It will be noted that in all of the extended or retracted positions of the combination windshield and hatch cover 8—21, the windshield, the supporting arms 12 and the hull 6 each form the sides of a triangle which may be caused to assume a plurality of fixed shapes and positions with respect to the hull. This triangle has only one side which is fixed in length, being that of the cover member portion 8 between the axis of the rollers 9 and the pivot pins 14. The other two sides of the triangle, namely, the adjustable rod arm 12, and the hull portion along the track 11, are subject to being varied considerably in length, depending on the position of the rollers 9. The three angles of the said triangle having their vertices at the roller 9, the pivot pin 14 and the swiveling fitting 15 are all adjustable and variable. The position and inclination of the windshield cover 8—21 is readily adjusted by varying the sides and angles of this triangle and is simply and easily held in the desired position merely by tightening the thumb screws 16 thereby fixing all of the lengths of the sides of the said triangle and the angles formed between the rods and the hull.

It will be obvious to those acquainted with the art that several of the fittings per se used with my invention form well known and extensively used articles of standard hardware which have found extensive application in the analogous arts. It will be obvious that other similar parts and fittings forming substantially the equivalents thereof may be substituted with equally satisfactory results.

The invention is obviously not limited to the flying boat type of aircraft shown, but can also be used in conjunction with the fuselages or other enclosed portions of land type aircraft. Neither is the invention limited to positions at the top or rearward portions of a fuselage as indicated in Fig. 1, but it can also be utilized for openings in the forward positions, at the sides or other portions of the fuselage.

It is to be understood that the drawing and the above description are for purposes of illustration only, and various changes and modifications which may occur to one skilled in the art are to be considered within the scope and spirit of this invention.

What I claim is:

1. In aircraft construction, a fuselage, a hatch comprising an opening therein, a cover member comprising a laterally curved sheet provided with a transparent portion, longitudinally extending guide rails attached to the said fuselage, rollers pivotally attached to forward corners of the said cover member and engaging the said guide rails such that fore and aft movement of the cover member and pivotal movement of the same about the said rollers are permitted, and adjusting means associated with the opposite corners of the said cover member whereby the same is releasably held at any position of the said rollers within the said rails and at any angular position of the cover member with respect to the said fuselage.

2. In aircraft construction, a fuselage, a hatch comprising an opening therein, a cover member comprising a laterally curved sheet provided with a transparent portion, longitudinally extending guide rails attached to the said fuselage, rollers pivotally attached to forward corners of the said cover member and engaging the said guide rails such that fore and aft movement of the cover member and pivotal movement of the same about the said rollers are permitted, and adjusting means associated with the opposite corners of the said cover member whereby the same is releasably held at a plurality of positions of the said rollers along the said rails and at a plurality of angular positions of the cover member with respect to the said fuselage for any given roller position along said rails.

3. In aircraft construction, a fuselage, a hatch comprising an opening therein, a cover member comprising a laterally curved sheet provided with a transparent portion, longitudinally extending guide rails attached to the said fuselage, rollers pivotally attached to forward corners of the said cover member and engaging the said guide rails such that fore and aft movement of the cover member and pivotal movement of the same about the said rollers are permitted, and adjusting means associated with the opposite corners of the said cover member whereby the same is releasably held at a plurality of positions of the said rollers along the said rails and at a plurality of angular positions of the cover member with respect to the said fuselage for any given roller position along said rails, the said adjusting means being capable of varying the distance between the pivotal attachment point at the cover member and the pivotal attachment point within the hatch opening.

4. In aircraft construction, a fuselage, a hatch comprising an opening therein, a cover member comprising a laterally curved sheet provided with a transparent portion, longitudinally extending guide rails attached to the said fuselage, rollers pivotally attached to forward corners of the said cover member and engaging the said guide rails such that fore and aft movement of the cover member and pivotal movement of the same about the said rollers are permitted, and adjusting means associated with the opposite corners of the said cover member and pivotally and translatably associated with the said fuselage whereby the cover member is releasably held at a plurality of positions of the said rollers with respect to the said rails and at a plurality of angular positions of the cover member with respect to the said fuselage.

ISAAC M. LADDON.